April 4, 1961  B. R. BETTER  2,978,082
OVERLOAD RELEASE CLUTCH
Filed June 18, 1957  2 Sheets-Sheet 1

INVENTOR
BERNARD R. BETTER
BY Brown, Jackson,
Boettcher & Dienner
ATTORNEYS

April 4, 1961     B. R. BETTER     2,978,082
OVERLOAD RELEASE CLUTCH
Filed June 18, 1957     2 Sheets-Sheet 2
FIG. 3     FIG. 5     FIG. 7
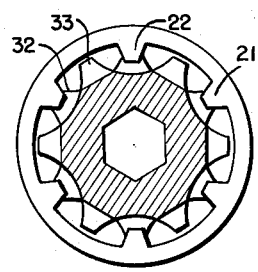 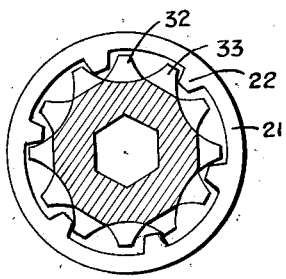 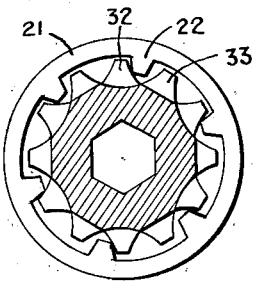
POSITION 1     POSITION 2     POSITION 3
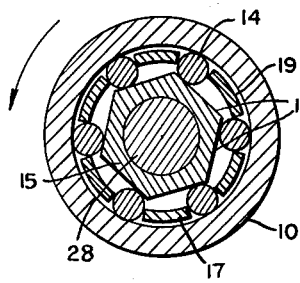 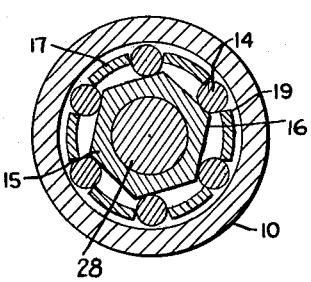 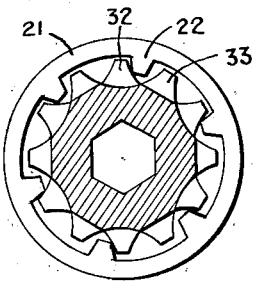
FIG. 4     FIG. 6     FIG. 8
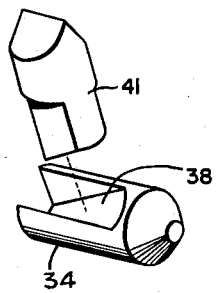
FIG. 10
INVENTOR
BERNARD R. BETTER
BY
Brown, Jackson,
Boettcher & Diemer
ATTORNEYS United States Patent Office 2,978,082
Patented Apr. 4, 1961

2,978,082

OVERLOAD RELEASE CLUTCH

Bernard R. Better, Chicago, Ill., assignor to Scully-Jones and Company, Chicago, Ill., a corporation of Illinois Filed June 18, 1957, Ser. No. 666,350

9 Claims. (Cl. 192—56)

This invention relates in general to torque devices and in particular to torque driving means for applying pre-determined amounts of torque to parts to be tightened or set such as screws, nuts, bolts and the like.

A principal object of this invention is the provision of a torque driving device for accurately controlling the amount of torque applied to parts acted upon within close limits with a provision of a safety release means which stops and maintains the stoppage of the torque applied to such part so long as the part resists the application of torque beyond pre-determined limits and the device is in a position to deliver torque on such part.

Heretofore, many torque driving devices of this type have been provided with a means of limiting the amount of torque to be applied to a part acted upon by some mechanism which would disengage when a pre-determined torque value was reached but such devices had the inherent disability of not remaining in such disengaged relationship as long as the device was in a position to deliver such torque and would from time to time engage. In such prior art devices where provision was made attempting to maintain the parts disengaged thus preventing any continued or intermittent delivery of torque, the various parts were complicated and difficult to manufacture. Too, many such prior art devices were not operable in both directions, nor was any provision made for automatically re-setting this device for further operation.

Accordingly, still another object of this invention is to provide in a torque driving device, which is operable in either direction, a means of maintaining the working parts of this torque device in a position where no torque will be delivered to the part acted upon so long as the device is in a position to deliver such torque once an excessive torque value is reached and when said device is released from such position to re-set or re-cycle itself for the next operation on another part.

Still another feature of this invention is the provision of a new and improved means of adjusting the amount of torque at which the various parts will release into a non-torque transmitting position in the event that the torque applied to the part acted upon exceeds a pre-determined value.

Still another object of this invention is the provision of a torque driving device which is operable in either direction and is simple to manufacture and easy to assemble.

I propose to accomplish the above objects and features of this invention by the provision of a roller clutch driving mechanism with means including camming areas and free-wheeling areas on one of the members whereby the rollers will override the cams and go to the free-wheeling areas so that no torque is transmitted through the rollers when a pre-determined amount of torque has been exceeded. The device also contains a star-shaped toothed means on the cage and on its bit holder means which cooperate for maintaining the rollers in the non-driving or free-wheeling areas so long as the torque driver is in a position to deliver torque to the part acted upon, and, upon its release therefrom, will re-set the rollers adjacent the cams, i.e., re-cycle the device for another operation. My invention still further contains a new and improved accurate spiral ring and adjusting pin means for controlling the maximum value of the torque to be delivered prior to the overrunning of the rollers into the free-wheeling areas by controlling the position of the inner and outer members on which the rollers ride.

Accordingly, still another object of this invention is a new and improved means of adjusting the maximum amount of torque which the device will deliver before the clutch will release into free-wheel position in the event that the torque resistance exceeds such amount.

Still another and important feature of this invention is a simplified provision in the torque driver of this type which allows delivery of torque to a part acted upon in either direction, as desired.

Other advantages and improvements will be apparent from the following description taken in conjunction with the accompanying drawings in which:

Fig. 3 is a cross-sectional view taken along line 3—3 of Fig. 1, looking in the direction of the arrows, and showing the relative position of the teeth of the cage and the teeth of the bit holder when the device is in driving relation with the part being acted upon;

Fig. 4 is a cross-sectional view taken along line 4—4 of Fig. 1, looking in the direction of the arrows and showing the rollers and cams in a position to drive when the teeth of the bit holder and cage are in the position shown in Fig. 3;

Fig. 5 is a cross-sectional view taken substantially along line 3—3 of Fig. 1, but showing the teeth of the cage and bit holder after the rollers have ridden over the cams into their free-wheeling positions;

Fig. 6 is a view taken along line 4—4 of Fig. 1 and showing the rollers in their free-wheeling or non-torque drive positions;

Fig. 7 is a view similar to Figs. 3 and 5 but showing the teeth of the cage and bit holder when the rollers are near their torque driving position and re-set for the next operation;

Fig. 8 is a view similar to Figs. 4 and 6 showing the cams and the rollers in their near driving position ready for the next operation;

Fig. 10 is a perspective view of the pin means which co-acts with the ring as shown in Fig. 9 to adjust the torque value of my device.

Figure 1:
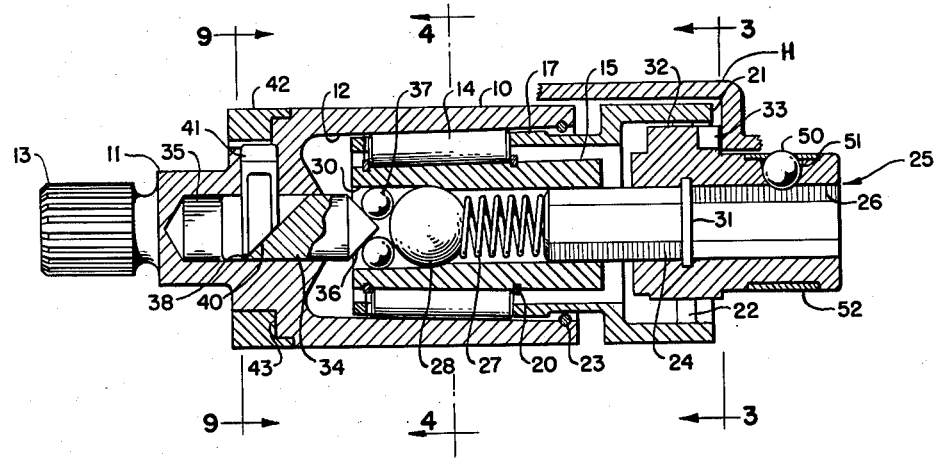
Fig. 1 is a longitudinal sectional view showing to advantage the various parts constructed in accordance with the teachings of my invention.
Figure 2:
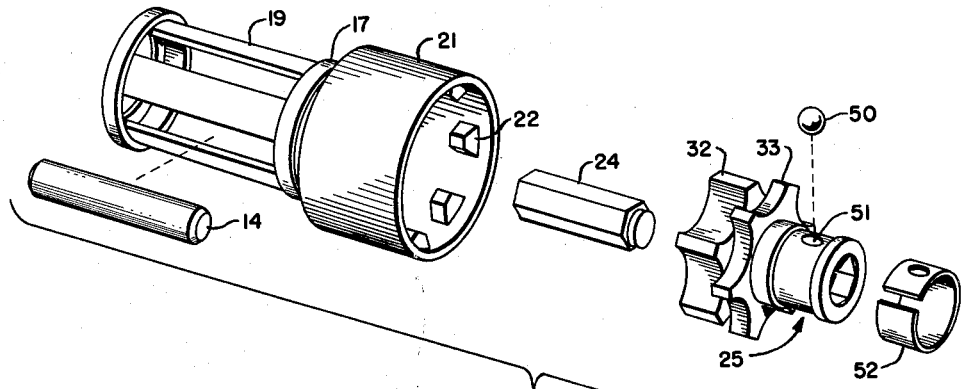
Fig. 2 is a perspective view showing to advantage the cage and the bit holder means of my invention in unassembled relationship.

Referring now to the drawings and in particular to Fig. 1 thereof, there is shown a torque driving device having a deformable cylindrical driving member or outer cylindrical shell, indicated in its entirety as 10, having a shank 11 and provided with an inner tapered bore 12 which tapers decreasingly towards shank 11. Shank 11 is provided with a splined portion 13 for attaching to a suitable source of power (not shown), and the entire device may be incorporated in an outer housing H, only partially shown. Tapered bore 12 provides the outer race for plurality of rollers 14 evenly spaced about the periphery of a driven member 15 axially received in bore 12 but spaced therefrom. Driven member 15 is formed, in this embodiment and more clearly shown in Figs. 4, 6 and 8, hexagonally in cross-section to provide an inner race having longitudinal camming surfaces 16 for the rollers 14. The number of camming surfaces, the cross-sectional shape, and diameter of the driven member 15 will depend upon the number and size of rollers selected, six being shown. Partly received within the outer member 10 and surrounding the driven member 15 is a cage 17 suitably provided near one end thereof with a plurality of longitudinal slots between roller positioning portions 19 (see Fig. 2) in which slots the rollers 15 are received and maintained evenly spaced around the inner race or driven member 15. Axial movement of the rollers is prevented by any suitable means such as retaining rings 20 suitably affixed about the driven member 15. Cage 17 extends to the right, as shown in the drawings, beyond the terminal portion of the driving member 10 and radially outwardly to form a flanged circular portion, indicated in its entirety as 21, which has a plurality of radially inwardly extending teeth or prongs 22 (six being shown) as more clearly shown in Figs. 3, 5 and 7.

Suitable means such as retaining ring 23 may be provided for retaining the cage within the outer shell 10 as shown.

Driven member 15 is axially, centrally bored and hexagonally formed at its right end to receive one end of a complementary hexagonally shaped coupling means 24 which extends to the right beyond the terminal portion of the driven member to provide the coupling or driving relation between driven member 15 and a bit or tool holder, indicated in its entirety at 25, which is also centrally, axially, and hexagonally formed as indicated at 26 to receive the other end of the coupling means. A suitable spring means 27 sets at one end against the terminal end of the coupling means 24 and at the other end against a ball bearing 28 which is received in and seated against one end of an enlarged counter-bore 30 within the driven member 15. Ball 28 in part permits rotational movement of the spring 27 relative to the remainder of the device for a purpose hereinafter to be described.

The right hand portion of the hexagonal coupling 24 is seated against suitable retaining means such as retaining ring 31, as illustrated, or there may be a pin through bit holder 25 and coupling 24 to eliminate axial movement therebeyond and, in effect, form one integral piece therewith.

Bit holder 25 is provided with two star-like sets 32 and 33 of radially extending teeth or prongs of six each which complement the teeth 22 of the circular ring 21 of cage 17 and are spaced evenly about the bit holder so as to provide a free play between themselves and the teeth 22 of the cage as will be explained. It is to be noted also that the teeth of set 33 are off-set with respect to each other as shown for a purpose hereinafter to be described. Bit holder 25, in cooperation with the hexagonal coupling 24, a part of which is slidably received within the driven member 15, may move to the right or to the left, with or against the spring 27 as desired, to align either teeth set 32 or 33 with the teeth 22 of cage portion 17. Movement of the bit holder 25 to the right is prevented by housing H which contacts the side faces of teeth 33.

At the left hand portion of the driving member 10, there is provided an adjusting pin 34 which is slidably received in axial bore 35 formed in the driving member. Adjusting pin 34 is provided at its right end with a tapered surface 36 which rests against a plurality of balls 37 (two shown) of less diameter than the ball 28 permitting relative rotation between the balls 37, 28, the pin 34 and the remainder of the torque driving device. Intermediate the ends of the adjusting pin 34, there is provided an inclined surface 38 formed by a cut in the pin as more clearly shown in Fig. 10, which cooperates with a similarly inclined surface 40 on an actuating pin 41 also more clearly shown in Fig. 10 which extends radially outwardly or normal to the adjusting pin 34. Movement of the actuating pin radially inwardly or radially outwardly causes movement of the adjusting pin 34 to the right or to the left which in turn transmits this axial movement to the shell 10. Since the shell 10 has a tapered bore, the distance between it and the tapered surface of the driven member 15 will vary according to the relative position of the two. If the distance between the two members is relatively small, the amount of torque required to cause distortion or deformation of the outer shell will be increased and, vice versa, when the distance between two members is less, the amount of torque required to deform the outer shell is less.

Figure 9:
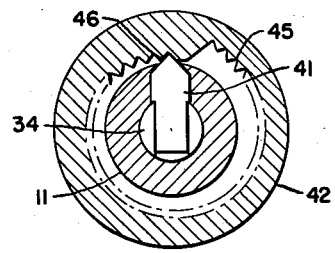
Fig. 9 is a cross-sectional view taken along line 9—9 of Fig. 1, looking in the direction of the arrows and showing the ring and pin means for adjusting the maximum torque value of the driver.

To move actuating pin 41 radially inwardly or outwardly, a ring-like member 42 having circular outer diameter (and in this embodiment of the same diameter as the outer diameter of the shell 10) is received in a circular complementary groove 43 formed in the shell. Radially inwardly of the outer diameter of ring-like member 42, there is provided a spiral, as more clearly shown in Fig. 9, with serrations 45 wherein the tapered end portion 46 of the actuating pin 41 may be received and whereby the spiral is in effect, an eccentric, to vary the radial position of the actuating pin 41. The spiral on the adjusting ring 42 provides an accurate and novel means of adjusting the maximum torque value of the torque driver by its cooperation with actuating pin 34 and may be indexed by its relative position about the shell 10 to indicate a particular value of maximum torque setting. Obviously, the spring 27 serves to maintain the relative relationship of the adjusting pin 34, the actuating pin 41 and the ring 42, and any suitable means may be provided for maintaining the ring 42 on the torque device.

Having thus described the structural features of my invention, I will now describe the operation thereof. Reference is made to Figs. 3 through 8 wherein Figs. 3 and 4 represent Position 1; Figs. 5 and 6 represent Position 2; and Figs. 7 and 8 represent Position 3.

When the maximum torque value has been properly set by operation of the adjusting ring 42, actuating pin 41 and adjusting pin 34 and the proper tool has been connected to the bit holder 25 in a manner to be later described, the tool may be placed against the part to be acted upon, such as a screw, nut or the like, and with a slight pressure, sufficient drag or inherent friction will cause the rollers 14 to react against cams 16 of the driven member 15 and by rotation of the driving member 10 in the direction shown in Fig. 4, the driven member 15 will be caused to rotate in a similar direction. Torque will thus be imparted from the driving member 10 to the tool. It will be noted in Fig. 3 that the teeth of set 33 on the bit holder 25 are substantially evenly spaced between the radially inwardly extending teeth 22 on the cage portion 21 and that the teeth of set 32 on the bit holder 25 are in the position as shown in Fig. 3, set 32 being axially aligned with set 22 at this time. The exact position of teeth 22 between teeth 33 in the driving position will vary somewhat depending upon the particular torque setting which has been chosen. It will be noted, however, that, because of the particular width or depth of the sets 32 and 33 with respect to the set of teeth 22, no interference between the various sets of teeth is encountered at the time the torque is delivered to the part being acted upon.

When and if, the torque exceeds the selected value because of increased resistance from the part being acted on, the outer member 10, being resilient, deforms and permits the rollers to ride over the peaks of the camming surfaces 16 and into the areas of clearance between the inner race and the outer race, otherwise known as the non-driving areas, for free-wheeling of the device without noise or excessive friction. At this instant, teeth set 33 of bit holder 25, being drivingly connected to the driving means 15 which has stopped driving, will be engaged by the teeth 22 of roller cage 17 as shown in Fig.

5. Since the teeth of set 22 are part of the cage 17, the rollers will be retained in the position of non-driving relationship as shown in Fig. 6 so long as the bit holder is being pressed against the part acted upon. When the bit holder is released from the part acted upon, the spring 27 engaging the hexagonal coupling will urge the bit holder outwardly (or to the right as shown in Fig. 1) so that the teeth of set 32 will move into the plane defined by the teeth 22, and the teeth 22 on the roller cage 17 will no longer be blocked from rotational movement by teeth of set 33. The roller cage 17 may then rotate further (counter-clockwise as viewed in Figures 3–8) until its teeth 22 come into engagement with teeth of set 32 as shown in Figure 7. The rollers 14 are then still held in free-wheeling position relative to the driven member 15 as shown in Fig. 8. The friction between housing H and the side faces of gear set 33 aid in this positioning. The torque driving device is re-set or re-cycled and is then ready to engage another part to be acted upon. Then when the bit holder is pressed toward another part to be acted upon, thus causing the teeth of set 32 to leave the plane of teeth 22 and the teeth of set 33 to re-enter that plane, cage 17 and its teeth 22 will rotate slightly further into the drive position of Figure 3 by reason of inherent friction, when the driving member 10 rotates in the direction of the arrow of Figure 4.

It is important to note in connection with the operation of my device that the cams 16 and free wheeling areas are symmetrical with each other, teeth sets 22, 32, 33 are symmetrical, and all other parts are so constructed and arranged to permit the device to operate in either direction of rotation of the shell 10. Obviously too, the maximum driving torque value available through my device will depend on the resilience of the outer shell (preferably of metal), and the angle of the cams.

For convenience, the bit holder 25 is axially hexagonally bored throughout as shown at 26 to receive a suitable tool means of any type such as a screw driver (not shown) and is provided with a ball poppet 50 retained in a complementary hole 51 in the bit holder by means of a resilient retaining band 52. The tool will be shaped with a peripheral groove and the ball 50 is urged radially inwardly therein to expand by operation of the snap ring 52 in a well-known manner. If another type of holder is desired, the ball poppet 50 and hole 51 may be replaced by a pin and bore (not shown) to fasten a hollow coupling means having an inner diameter slightly greater than the outer diameter of the end portion of the bit holder 25 and which is slidably fitted over the bit holder to connect to a suitable tool as desired.

Wherein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. A torque driver including means to connect to a part to be acted upon thereto comprising in combination; a deformable driving member; means including a driven member mounted in said driving member; tapered surfaces on said driving member and said driven member, one of said surfaces being further provided with a plurality of spaced cams and with non-driving areas between said cams; a roller cage; rollers in said cage and disposed for engagement with one said tapered surface and said cams so that said driving member when rotating will deliver torque to said driven member upon slight pressure of said means including said driven member against said part; means for selecting the maximum value of the driving torque beyond which value the forces will be sufficient to cause a radial deformation of the driving member and allow the rollers to ride over the cams and into the non-driving areas comprising axially movable means supported at least in part by said driven member, radially movable means supported at least in part by said driven member and interengaging said axially movable means whereby radial movement thereof causes axial movement of said axially movable means to change the distance between said tapered surfaces, and rotatable means externally supported on said driven member and operatively associated with said radially movable means for movement thereof; means for maintaining said rollers in the non-driving areas as long as said selected maximum value of said driving torque is exceeded and so long as said slight pressure on said part is maintained; and means to return said rollers to near engagement with said cams upon release of said pressure of said means including said driven member on said part.

2. In a roller clutch torque driver having a distortable driving means, driven means adapted to be connected in driving relationship with a part to be acted upon and having camming surfaces and free-wheeling areas thereon, rollers between said driving means and said driven means adapted to engage said camming surfaces to deliver torque from said driving means to said driven means when said driven means is pressed against said part and to override said camming surfaces into said free-wheeling areas to cease delivery of torque when the torque exceeds a pre-determined value, the combination of star-shaped tooth means operatively connected to said rollers for maintaining said rollers in said free-wheeling areas so long as said torque exceeds said pre-determined value and said driven means remains pressed against said part, and means for re-setting said rollers adjacent said camming surfaces when said driven means is withdrawn from torque transmitting relationship with said part to ready said roller clutch driver for further operation.

3. The combination of claim 2, together with means for varying the value of the maximum torque to be delivered by said torque driver.

4. For use in a torque driver having deformable driving means, driven means adapted to be connected in driving relationship with a part to be acted upon and having cam surfaces and adjacent free wheeling areas, rollers disposed between said driving means and said driven means and adapted to be in driving relationship between said cam surfaces and said driving means to deliver torque from said driving means to said driven means when the driven means is pressed against said part, and to override said camming surfaces into said free wheeling areas to cease delivery of torque when the torque exceeds a pre-determined value—the improvement comprising a plurality of toothed members carried by said roller cage to one side of said rollers and a plurality of toothed means associated with said driven member, with said sets of toothed means being adapted to inter-engage to maintain said rollers in said free wheeling areas so long as the torque exceeds the pre-determined value and said driven means remains pressed against said part, and further toothed means for cooperating with said first toothed means for shifting said rollers from the aforementioned free wheeling position to a position adjacent said cam surfaces when said driven means is withdrawn from torque transmitting relationship with said part, whereby said torque driver is readied for a further driving operation.

5. For use in a torque driver having deformable driving means, driven means adapted to be connected in driving relationship with a part to be acted upon and having cam surfaces and adjacent free wheeling areas, rollers disposed between said driving means and said driven means and adapted to be in driving relationship between said cam surfaces and said driving means to deliver torque from said driving means to said driven means when the driven means is pressed against said part, and to override said camming surfaces into said free wheeling areas to cease delivery of torque when the torque exceeds a predetermined value—the improvement comprising a first set of equally spaced teeth, said teeth being disposed in a plane perpendicular to the axis of the roller cage and integrally formed on said cage, a second set of equally spaced teeth operatively associated with said driven means and adapted to cooperate with said first set of teeth for maintaining said rollers in the free wheeling areas, by reason of inter-engagement of said sets of teeth, as long as the selected maximum value of the driving torque is exceeded and so long as pressure of the driven means is exerted on said part; a third set of equally spaced teeth operatively associated with said driven member but axially and circumferentially separated from said second set of teeth, adapted, when pressure of the driven member towards said part is relieved, to shift said rollers from the aforementioned free wheeling position to a position adjacent the cam surfaces to ready said torque driver for a further driving operation.

6. For use in a torque driver having means adapted to be connected to a part to be acted upon, deformable driving means, driven means adapted to be connected in driving relationship with a part to be acted upon, tapered surfaces on said driving means and said driven means, one of said surfaces being further provided with a plurality of spaced cams and with nondriving areas between said cams, a roller cage with rollers in said cage disposed for engagement with one said tapered surface and said cams for transfer of torque from the driving means to the driven means when said driven means is pressed against said part—the improvement comprising means providing for the shifting of said tapered surfaces toward or away from each other to vary the maximum torque at which the deformable driving means will permit said rollers to overrun the cam surfaces and reach the non-driving areas between the cams, said means including axially movable means supported at least in part by said driving means, radially extending means supported at least in part by said driving means and adapted to engage said axially movable means for moving the latter axially, and means exteriorly of the torque driver and supported by said driving means adapted to have operative association with said radially extending means for shifting the position of the latter.

7. The improvement of claim 6 wherein the means exteriorly of the torque driver and carried by the driving means is a rotatable ring having an inner surface of varying curvature adapted to engage an end of the radially extending means in the form of a pin and wherein the axially extending member in the form of a pin has an inclined surface engageable by said radially extending means.

8. The improvement of claim 7 wherein said radially extending pin has a tapered radially outer end and the inner surface of said ring has serrations adapted to cooperate therewith to maintain a relatively fixed position between the pin and rings and wherein resilient means carried by the torque driver maintains said pin and ring in engagement.

9. The improvement of claim 8 wherein an end of the axially extending pin has bearing engagement with said driven means through bearing means which is in engagement with said driven means and the resilient means.

References Cited in the file of this patent
UNITED STATES PATENTS 2,771,804      Better et al. _____ Nov. 27, 1956